(12) United States Patent
Alcaide Hernández et al.

(10) Patent No.: US 11,926,290 B2
(45) Date of Patent: Mar. 12, 2024

(54) FLUID DISPENSING SYSTEM

(71) Applicant: Fico Transpar, S.A., Barcelona (ES)

(72) Inventors: Olallo Alcaide Hernández, Viladecavalls (ES); Jose luis Villarrubia Guarino, Viladecavalls (ES)

(73) Assignee: FICO TRANSPAR, S.A., Barcelona (ES)

( * ) Notice: Subject to any disclaimer, the term of this patent is extended or adjusted under 35 U.S.C. 154(b) by 443 days.

(21) Appl. No.: 17/416,288

(22) PCT Filed: Dec. 17, 2019

(86) PCT No.: PCT/EP2019/085767
§ 371 (c)(1),
(2) Date: Jun. 18, 2021

(87) PCT Pub. No.: WO2020/127359
PCT Pub. Date: Jun. 25, 2020

(65) Prior Publication Data
US 2022/0097655 A1    Mar. 31, 2022

(30) Foreign Application Priority Data

Dec. 18, 2018  (EP) .................................. 18382943

(51) Int. Cl.
*B60S 1/48* (2006.01)
*B05B 1/28* (2006.01)
(Continued)

(52) U.S. Cl.
CPC .............. *B60S 1/481* (2013.01); *B05B 1/28* (2013.01); *B05B 1/3093* (2013.01); *B05B 9/035* (2013.01);
(Continued)

(58) Field of Classification Search
CPC . B60S 1/481; B60S 1/526; B05B 1/28; B05B 1/3093; B05B 9/035; B05B 12/08;
(Continued)

(56) References Cited

U.S. PATENT DOCUMENTS

| 6,237,861 B1 * | 5/2001 | Northrop | ................ B60S 1/603 239/284.1 |
| 2003/0075207 A1 * | 4/2003 | Fukushima | ............... B60S 1/58 134/123 |

(Continued)

FOREIGN PATENT DOCUMENTS

| CN | 109720298 A | * | 5/2019 | .............. B08B 3/02 |
| DE | 4121316 A1 | | 1/1992 | |

(Continued)

OTHER PUBLICATIONS

International Search Report for International Application No. PCT/EP2019/085767; International Filing Date: Dec. 17, 2019; dated Apr. 2, 2020; 4 pages.

(Continued)

*Primary Examiner* — Bob Zadeh
(74) *Attorney, Agent, or Firm* — CANTOR COLBURN LLP (57) ABSTRACT

The fluid dispensing system (100) comprises at least one fluid source (110), at least one pump (130-1, 130-2, 130-3, . . . , 130-N), at least one telescopic fluid dispenser (140'-1', 140'-2', 140'-3', . . . , 140'-M'); a control unit (160) to operate the pump (130-1, 130-2, 130-3, . . . , 130-N) for supplying fluid (120) according to a received command of washing at least one target object (150-1, 150-2, 150-3, . . . , 150-O), a manifold (180), and at least one control valve assembly (V-1, V-2, . . . , V'-P') comprising a fluid inlet for receiving fluid from the at least one fluid source (110), a first fluid outlet for discharging fluid into the at least one telescopic fluid dispenser (140'-1, 140'-2,

(Continued)

140'-3, . . . , 140'-M'), and a second fluid outlet for allowing fluid to flow back away from the telescopic fluid dispensers (140'-1, 140'-2', 140'-3', . . . , 140'-M') when retracting from the extended position to the rest position.

20 Claims, 2 Drawing Sheets

(51) Int. Cl.
    *B05B 1/30*     (2006.01)
    *B05B 9/03*     (2006.01)
    *B05B 12/08*     (2006.01)
    *B05B 15/18*     (2018.01)
    *B05B 15/656*     (2018.01)
    *B05B 15/74*     (2018.01)

(52) U.S. Cl.
    CPC .............. *B05B 12/08* (2013.01); *B05B 15/18* (2018.02); *B05B 15/656* (2018.02); *B05B 15/74* (2018.02)

(58) Field of Classification Search
    CPC ....... B05B 15/18; B05B 15/656; B05B 15/74; B05B 15/70; F04D 15/00; F04D 15/029
    See application file for complete search history.

(56) References Cited

U.S. PATENT DOCUMENTS

| | | | |
|---|---|---|---|
| 2014/0367488 A1* | 12/2014 | Dominique | B60S 1/481 239/284.1 |
| 2018/0251099 A1* | 9/2018 | Satarino | B60S 1/50 |
| 2022/0097655 A1* | 3/2022 | Alcaide Hernández | B05B 15/74 |

FOREIGN PATENT DOCUMENTS

| | | | |
|---|---|---|---|
| DE | 10115975 A1 * | 10/2002 | B60S 1/481 |
| EP | 1857338 A1 | 11/2007 | |
| FR | 3056518 A1 | 3/2018 | |
| FR | 3056520 A1 | 3/2018 | |
| WO | 0243995 A1 | 6/2002 | |
| WO | 03002390 A1 | 1/2003 | |

OTHER PUBLICATIONS

Written Opinion for International Application No. PCT/EP2019/085767; International Filing Date: Dec. 17, 2019; dated Apr. 2, 2020; 6 pages.

European Search Report for European Application No. 18382943.1 filed Dec. 19, 2018; dated Mar. 11, 2019; 7 pages.

* cited by examiner

FLUID DISPENSING SYSTEM

CROSS-REFERENCE TO RELATED APPLICATIONS

This is a National Stage Application of PCT/EP2019/085767, filed Dec. 17, 2019, which claims priority to European Application No. 18382943.1, filed Dec. 18, 2018, both of which are incorporated herein by reference in their entirety.

TECHNICAL FIELD

The present disclosure relates to fluid dispensing systems, in particular those including telescopic nozzles to deliver liquid into one or more target objects. The present fluid dispensing system finds application for example in washing devices for washing motor vehicle parts such as optical parts although other applications are not ruled out.

BACKGROUND

In known fluid dispensing systems, fluid is pumped from tanks or reservoirs by suitable pumps and discharged out towards a target object through nozzles that are connected to the pumps.

U.S. Pat. No. 5,190,442 discloses an electronic pump control system for ensuring that pumps run for the same percentage of time. The system comprises a container for liquid, sensing means for determining the level of liquid in the container, a number of pumps each having an inlet communicating with the container and an outlet communicating with a common conduit for liquid being pumped out of the container, and a pump controller with processor means for controlling the operation of the pumps and for starting and stopping individual pumps.

A further pump control system is disclosed in GB2537461. It comprises a reservoir, a pump, a reservoir level sensor, a current monitor to monitor the current drawn by the pump, and a controller to generate head data from level data and determining a difference between current drawn in different periods, providing a pump performance indicator showing the condition of the pump. A performance indicator is calculated for each period, allowing an operator to predict when maintenance is required.

In known fluid dispensing systems for washing devices it has been found that since fluid dispensers are connected to corresponding pumps and pumps are all operated in the same way, wear is always produced in the same pumps in the fluid dispensing system. This in practice involves drawbacks since pumps wear in different ways and therefore some pumps could be required to be serviced or repaired while others still work well.

Another problem found in fluid dispensing systems including telescopic fluid dispensers comprising mutually displaceable bodies for varying the position from which fluid is supplied is that, in order to arranged the telescopic fluid dispensers all suitably concealed in the vehicle when in a rest, i.e. non-operating, position, all of the telescopic fluid dispensers are required to be disabled, that is, with no fluid flowing therein. There may be however cases when at least one telescopic fluid dispenser should be still enabled in case a particular target object still has not been completely washed. Residual fluid may thus exist, trapped in the telescopic fluid dispensers which disadvantageously acts as a stop during backward movement of the telescopic fluid dispenser. As a result, the fluid dispenser fails to reach its concealed position.

SUMMARY

The above problems are overcome with a fluid dispensing system as the one herein disclosed. With the present fluid dispensing system, many significant advantages are also obtained as it will be explained in the following.

Within the meaning of the present disclosure, target object refers herein to a sensor, an optical surface of a sensor for example fitted in a motor vehicle, or any other kind of surfaces in motor vehicle parts such as windshields, sensor protectors, headlamps, etc. and, in general, parts required to be washed. Different target objects may have different cleaning requirements and thus different amounts of fluid, delivered at different pressures, etc. For example, having the same soiling status or dirtiness condition, a Lidar may require a greater flow rate than a camera.

The present fluid dispensing system comprises at least one fluid source, such as a tank or reservoir, suitable for containing fluid such as washing liquid. As used herein, at least one fluid source means that one or more fluid sources may be provided having the same or different capacities. One example of fluid is a suitable washing liquid.

At least one pump is provided. Said at least one pump is configured to be supplied with fluid such as washing liquid from the fluid source. Examples of said at least one pump are DC powered 2-3 bar radial turbo centrifugal pumps capable of supplying a flow rate of the order of 5000 $cm^3$/min, normally 2000 to 3000 $cm^3$/min. Other types of pumps, such as variable output pumps, are of course possible as long as they are capable of being supplied with fluid from the one or more fluid sources. Pumps used for the purposes of the present disclosure such as for automotive applications may have for example an operating voltage of the order of 9.5-11V. Different orders of magnitude for pump voltages are also possible depending on requirements and applications. Electrical power may be supplied to the pumps by a power supply such as a battery that may be built-in a control unit or it may be a separate power supply. Said control unit can communicate with the power supply for supplying the required electrical power to the pump which is controlled by the control unit.

When two or more pumps are provided, they may be arranged at different heights in the fluid source and associated with corresponding outlets. As used herein, the expression "height" means a distance from a given first point, such as the ground, to a second, different point that belongs to a pump itself or to a portion thereof such as for example a pump body, or a connection between the fluid source and the pump (a tank fluid outlet, for example), or any other element in the pump. Thus, although the most usual scenario is a number of pumps provided at different heights in the fluid source, the expression "pumps arranged at different heights" encompasses also a number of pumps arranged at the same height but connected to the fluid source at points located at different heights.

The at least one pump is suitable for allowing a volume of fluid such as washing liquid present in the fluid source to be pumped out and accurately determined. Determining a volume of fluid in the fluid source may be carried out from a condition when the pump or the pumps arranged at a given height stop drawing fluid from the fluid source since no fluid is present. This can be carried out by a control unit which will be described further below, adapted to be fed by operating parameters of said pumps. As a result, detection of fluid level at discreet positions may be possible. With said pump arrangement when a given pump is determined not to work properly, another pump located at a lower height may be operated.

Also, when two or more pumps are provided, at least some of the pumps may be arranged in parallel to each other. Pumps are preferred to be arranged in parallel to each other when higher flow rate is required to be supplied than in the case if one pump is provided. Otherwise, pumps are preferred to be arranged in series to each other when higher pressure fluid is required to be supplied than in the case if one pump is provided.

Still in further examples when two or more pumps are provided, at least some of the pumps may be arranged in series to each other. Other pump arrangements and combinations thereof are of course possible.

In addition, when two or more pumps are provided, at least one of them may have different capacity from the others although it is preferred that pumps in the present fluid dispensing system all have a single characteristic curve or power. However, there may be cases where pump power may be adjusted over time by the control unit for the same pump. For example, the control unit may operate one or more pumps at a specified time providing a pressure of 1.5 bars while, at another time, the same one or more pumps may be operated to supply a pressure of 2 bars, for example.

The present fluid dispensing system further comprises at least one telescopic fluid dispenser. One or more of the at least one fluid dispenser may be configured, for example, as a nozzle. Said at least one telescopic fluid dispenser is configured to receive fluid such as washing liquid from the at least one pump and dispensing it towards at least one target object. The at least one telescopic fluid dispenser may comprise two mutually displaceable bodies such that the fluid dispenser is thus capable of extending from a rest position, concealed in the vehicle, to an extended position, and retracting from the extended position to the rest position. The position from which fluid is supplied can be therefore varied as required.

In some examples, the present fluid dispensing system may also include at least one non-telescopic fluid dispensers.

In any case, the fluid dispensers may preferably be configured to deliver fluid in a single direction out of the fluid dispensing system. The number of fluid dispensers may be different from the number of pumps, or they may be the same, as required. Also, the number of fluid dispensers may be different from the number of target objects depending, for example, upon the surface size or surface shape of the target object to be washed. For example, a number of fluid dispensers could be used for washing one target object. Fluid lines feeding fluid dispensers may be preferably arranged in parallel.

The present fluid dispensing system further comprises at least one control unit configured to operate the at least one pump for supplying fluid according to a received command of washing at least one target object. The control unit may be, for example, an electronic control unit (ECU) associated with the one or more pumps for operating at least one selected for supplying fluid towards one or more target objects. The control unit is capable of receiving a command for washing one or more target objects. The control unit is further configured to select the pump, or more pumps when provided, to be operated. When more than one pump is provided, the control unit is capable of selecting which pump or pumps has/have to be operated depending on one or more of pump accumulated wearing or fatigue, a soiling status or dirtiness condition of a target object, the nature of the target object such as type or size of the target object, the location of a target object relative to a pump, and at least one driving condition, for example, when a motor vehicle where a target object is fitted is moving forward, backwards, or it is stopped or parked.

In one example, when the target objects are optical sensors, each sensor may require of the order of about 30 to 90 $cm^3$ of washing fluid in each washing cycle. A washing cycle may typically last 1 to 3 s.

In order for the control unit to select at least one specific pump depending on pump accumulated wearing or fatigue, as stated above, the control unit is capable to control pump operation. Specifically, the control unit may be configured to monitor at least one change in at least one operating parameter related to the operation of at least one pump. The fact that the control unit may be configured to monitor pump operating parameters refers to the capability of the control unit for monitoring a pump status in order to select the most appropriate pump to be operated for washing a specific target object.

The control unit may be also configured to determine a volume of fluid present in the fluid source based on said pump operating parameters or on a change thereof as stated above when pumps are arranged at different heights in the fluid source. As stated above, pump height refers both to the height of the pump itself or to the height of its connection to the fluid source.

Pump operating parameters may be one or more of voltage, current, fluid flow rate, or frequency. Frequency and flow rate are preferably taken as indirect measurements that can be calculated based on the voltage and the current or amperage associated with the pumps. Frequency and flow rate may of course be directly determined through suitable sensing devices other than by indirect measurement. As used herein, frequency is referred to the angular speed of a pump rotor per time unit, that is, revolutions per minute.

Thus, there are in general two types of operating parameters to be used. The first operating parameters are voltage and current which are a measured directly. The second operating parameters are those measured indirectly through experimental data which are converted into voltage, current, pressure and flow rate values. The flow rate values can be obtained directly through said flowmeter and pressure values can be obtained directly through a pressure gauge.

Other operating parameters may be of course used such as pump torque. In any case, voltage and current are preferred operating parameters for the control unit to monitor pump operation. Pump voltage is kept substantially stable or constant over time by the control unit, or it may vary only slightly, while pump amperage usually decreases over time due to pump fatigue, wear or damage.

When a decrease in pump power, which may be determined from a decrease in pump current, is received by the control unit, this is interpreted to mean that the said pump is wearing. This may be determined from flow rate-pressure and/or flow rate-current experimental characteristic curves associated with each pump. The control unit then causes said pump having such detected decreased power to be less used. As a result, the service life of said pump is advantageously extended.

Also, when a decrease in pump power is received by the control unit, this can be interpreted by the control unit as being due to a fluid level that is somewhat lower than height position of said pump whose power is decreased. The control unit then causes a different pump arranged at a lower height to be operated.

The control unit may be configured to supply the pumps with a voltage from which pump current is measured by the control unit. Pump voltage is kept substantially stable by the control unit. Pump operation is monitored by the control unit through pump current (amperage). In other words, for assessing whether a pump is working well or not, the control unit is input with pump current values which are compared with a predefined operating threshold. For example, current ranging from 0 to 0.5 A may mean that the pump is not operational due to a broken component or due to no fluid, such as washing liquid, present; current ranging from 0.5 to 1.9 A may mean that no liquid is being supplied but air; current ranging from 2 to 5 A may correspond to optimal values under which the pump is determined to work properly; current ranging from 5.1 to 9.9 A may mean that the liquid is frozen; and current ranging from 10 A or higher may mean a pump abnormal operation caused by short circuit.

Furthermore, the control unit is configured to monitor pump operation through pump temperature. When a pump is in operation for a long period of time or for many duty cycles, it gets hot which adversely affects pump operation. For example, the control unit may be configured to allow a hot pump to rest, without operating said pump during a suitable period of time, regardless fatigue or other parameters. Pump temperature values may be provided directly from a temperature sensor fitted in the pump itself. In preferred cases however, the control unit may be configured to determine pump temperature from the electrical power or current being consumed by the pump. If high current is being consumed by a pump or a large number of cycles has been performed by a pump, pump temperature may be determined by the control unit in order to allow the pump to rest during a given period of time so as to cool it down.

Proper pump operation can be thus efficiently controlled by the control unit from the power consumption of each pump.

From the above mentioned fluid parameters the control unit can determine suitable fluid demands in terms of amount, flow rate, and pressure of fluid that should be delivered towards the target object, and hence pumps to be operated to this effect. Fluid dispensers thus only provide, e.g. spray, a precise amount of fluid towards the target object for proper washing. Suitable fluid demand may be carried out by calculations and processing by the control unit based for example on the above mentioned flow rate-pressure and flow rate-current experimental characteristic curves associated with the pumps.

With the above control unit, intelligent pump management is advantageously performed by controlling pump status, and also how pumps age with time and usage which typically results in pumps being less efficient and supplying lower flow rate. In the present system, however, when this occurs, other pumps with less wear are operated by the control unit, as a result of which, pump life cycles advantageously become equal and overall service life is advantageously extended.

The control unit checks each pump capacity and decides which one(s) has/have to be operated and to which extent depending on pump operating parameters, soiling status or dirtiness condition of target objects, location of the target objects, nature of the target objects, a specific function of the target objects to be washed, etc.

The control unit not only is capable of selecting pumps to be operated, when two or more pumps are provided, and to which extent based on pump operating parameters and target objects to be washed according to soiling status or dirtiness condition, location, specific function and nature thereof, etc., but it is also capable of prioritizing said selection of pumps to be operated and target objects to be washed.

Regarding prioritizing selection by the control unit of one or more target objects to be washed, this may be based on the location of the target objects relative to the fluid dispensers or based on their position on a motor vehicle together with the condition of the motor vehicle, for example if it is moving forward, backwards, or if it is parked, etc. Thus, for example, considering a situation where a set of sensors in a motor vehicle comprising, for example, a Lidar, one front camera, two side cameras, and a rear camera, are required to be washed. In the event that the control unit of the present fluid dispensing system determines that insufficient flow rate/pressure is available for washing all the sensors at the same time, the control unit will take into consideration and prioritize one or more target objects to be washed depending upon their specific function or their location in the motor vehicle: in this case, the front camera would be prioritized by the control unit to be washed in the event that the motor vehicle where said sensor is fitted is travelling; or if the motor vehicle is moving backwards or being parked, the rear camera would be prioritized by the control unit to be washed in this particular case.

Regarding prioritizing selection by the control unit of one or more pumps to be operated, this may be performed by comparing different operating parameters relating to the operation of the selected pump such as tension and current, with data relating to a detected need for washing at least one target object, that is, soiling status or dirtiness condition of at least one target object. Based on said pump operation parameters, at least one selected pump will be prioritized and selected by the control unit to be operated for supplying fluid into at least one target object.

The control unit may be also configured so as to render operating flow rates stable, preferably among pumps of the same type. This causes fluid dispensers to work stably over time and correlated with temperature.

The control unit may be adapted to check active and available pumps. Pumps may also be considered by the control to be not available when they are broken or unusable so they are required to be replaced, and/or are they no longer working in the same way as they originally worked due for example to wear or failure. A warning signal in this respect may be output to warn an operator about pump status. Checking active and available pumps by the control unit is based on the above mentioned pump operating parameters.

The control unit may be also adapted to dynamically react to a failure occurring when trying to wash one or more target objects, recalculating washing power available and prioritizing target objects where necessary as stated above to ensure safety in driving.

Additional control units may be provided connected to the pumps for example to monitor at least one operating parameter of at least one pump for assessing operating parameters related to the operation of the pumps. In any case, as stated above, the control unit is configured to monitor pumps based on pump current by supplying them with electric power. Controlling pump current by the control unit may allow the presence of fluid flow to be determined.

The control unit may include at least one processor, a memory and/or other hardware such as input and output devices. The processor may be any type of processor capable of executing software, such as a microprocessor, a digital signal processor, a microcontroller, or the like. The memory may be a hard disk, read only memory (ROM), random access memory (RAM), flash memory, or any other nonvolatile storage, or any combination of the above devices, or any other type of non-transitory machine readable storage medium readable by processor capable of storing parameters relating to at least one of the soiling status or dirtiness condition of at least one target object for determining if said at least one target object is required to be washed, the capacity of at least some of the pumps in the system, etc. The memory may further store instructions or data for performing the execution of the method described herein.

A manifold is also provided. The manifold has at least one inlet into which the fluid is gathered from the at least one pump and a number of outlets from which the fluid is distributed towards the target object. In one example, the manifold may have a first manifold chamber. The first manifold chamber includes said at least one inlet and said outlets. The manifold further includes an independent, second manifold chamber. The second manifold chamber is fluidly connected to a first return line which will be described below.

According to an important feature of the present fluid dispensing system, at least one control valve assembly is provided. Said at least one control valve assembly is arranged between the manifold and the at least one telescopic fluid dispenser and is configured to be actuated by the above mentioned control unit. More specifically, the at least one control valve assembly comprises a fluid inlet for receiving fluid from the at least one fluid source, a first fluid outlet for discharging fluid into the at least one telescopic fluid dispenser, and a second fluid outlet for allowing fluid to flow back away from the at least one telescopic fluid dispenser when retracting from the extended position to the rest position. Said second fluid outlet of the at least one control valve assembly may be configured for allowing residual fluid trapped within the at least one telescopic fluid dispenser to flow back away therefrom when the at least one telescopic fluid dispenser retracts from the extended position to the rest position. The fluid allowed to flow back away from the at least one telescopic fluid dispenser may be fluid present, e.g. trapped, either within the at least one telescopic fluid dispenser or in a section between the at least one telescopic fluid dispenser and the at least one control valve assembly.

The at least one control valve assembly thus comprises at least three ways, that is, the above mentioned fluid inlet for receiving fluid from the at least one fluid source, i.e. from the manifold, the above mentioned first fluid outlet for discharging fluid into the at least one telescopic fluid dispenser, and the second fluid outlet for allowing fluid in the at least one telescopic fluid dispenser to flow back away from the at least one telescopic fluid dispenser when retracting from the extended position to the rest position. Within the above definition, the control valve assembly may be a three-way valve, or it may be a two-way valve operating in association with an additional fluid outlet, that is, the third way, for allowing fluid that may be present in the at least one telescopic fluid dispenser to flow back away from the at least one telescopic fluid dispenser. Other structures and combinations of structures are also possible.

In any case, the at least one control valve assembly operates with at least two directions of fluid flowing through the first fluid outlet, that is, a first direction of fluid flowing out through the first fluid outlet and a second direction of fluid flowing into the control valve assembly when the at least one telescopic fluid dispenser retracts from the extended position to the rest position.

In one example of the control valve assembly, it may comprise a valve body including a movable valve element capable of preventing fluid flow from entering the valve body, and allowing fluid flow entering the valve body and into the at least one telescopic fluid dispenser while preventing fluid from flowing out of the valve body. In this case, the valve element may for example comprise a rubber membrane capable of being pivoted into at least a first position where fluid is prevented from entering the valve body when no fluid is flowing from the fluid source, and pivoted into a second position by the fluid flowing from the fluid source into the valve body such that fluid is allowed to be supplied into the at least one telescopic fluid dispenser while preventing fluid from flowing out of the valve body.

A first return line may be provided fluidly connected to the above mentioned second fluid outlet of the at least one control valve assembly for allowing fluid to flow back away from the at least one telescopic fluid dispenser when the at least one telescopic fluid dispenser retracts from the extended position to the rest position. The first return line may be arranged for discharging backflow of fluid from the at least one telescopic fluid dispenser out of the fluid dispensing system.

A second return line may be provided fluidly connecting the manifold and the fluid source for recirculating fluid towards the fluid source. Said second return line allows recirculation of fluid ensuring the telescopic fluid dispensers to fully return to their retracted position even in the case that remaining fluid is still present during retracting of the body of the telescopic fluid dispenser. Fluid leaks can be thus efficiently detected by detecting fluid level in the fluid source. An unexpected level of fluid in the fluid source can be determined. A condition when there is no washing liquid at the inlet of the pumps can be also identified.

In other examples, the first return line may be connected to one or more of the second return line, or to the fluid source, or to an additional fluid source, or to the exterior of the assembly.

A solenoid valve may be provided somewhere along the return line to control fluid flowing through the return line. When provided, the solenoid valve may be controlled by the control unit. The purpose of the second return line is to perform an auto-check or self-testing function for ensuring a proper operation of the parts in the fluid dispensing system such as for example pumps, valves, and fluid dispensers. For this purpose, the control unit will operate parts in the fluid dispensing system and recirculate fluid through the second return line. With the fluid circuit closed, the control unit will be then capable of determining if fluid recirculation works correctly or not. When it is determined that fluid recirculation is not working correctly, this means that the pump or pumps or the check-valves are not working properly, the control unit will be capable of determining which pumps or check-valves are not working properly switching them on/off as appropriate. Suitable information can be displayed to a user or operator. The second return line may be also useful for detecting fluid leaks. When pumps are provided in the fluid source at different heights, as described above, said second return line allows fluid to be recirculated, and the control unit checks fluid level in the fluid source either permanently or from time to time, for example. For example, when a user takes a motor vehicle after it has been parked for some time, although the fluid dispensing system has not been operated automatically or manually by the user for washing a sensor, the control unit will automatically cause fluid recirculation in the fluid dispensing system in order to determine whether any leaking of fluid exists. In case that leaking of fluid is detected, the user will be warned accordingly.

There may be cases where at least two telescopic fluid dispensers are provided. At least one corresponding check-valve is also provided, fluidly connected to at least one control valve assembly. Such check-valves serve the purpose of preventing backflow of fluid from one telescopic fluid dispenser into another telescopic fluid dispenser.

At least one additional check valve may be also provided between the pump or pumps and the manifold or even in the pump if required. Such least one additional check valve is for preventing backflow towards the pump or pumps, e.g. towards pump or pumps which is/are not in use. Fluid is thus caused to flow in a single direction out of the fluid dispensing system, from the manifold to the fluid dispensers. The control unit may be adapted to operate one pump with all the check valves closed in order to detect valve failure.

One or more control valves may be provided in combination to the above mentioned non-telescopic fluid dispensers that may be provided in addition to the above mentioned telescopic fluid dispensers. In this case, the at least one control valve may be configured to be actuated also by the control unit. If provided, said at least one control valve would be arranged between the manifold and said at least one non-telescopic fluid dispenser. Also in the case, where a solenoid valve is provided, it would be arranged between the at least one fluid source and the at least one control valve.

The control unit may be configured to compare operating parameters relating to the operation of at least one pump with data relating to the detected need of said at least one target object so as to operate at least one selected pump for supplying fluid.

The at least one control valves and the at least one control valve assembly may be arranged between the manifold and the fluid dispensers to allow flow rate of fluid to be delivered to the target objects to be properly controlled. Each control valve and control valve assembly may be associated with at least one target object. Each control valve and control valve assembly may be actuated by the control unit according to command received for washing one or more target objects. If pumps are operated but no control valves/control valve assemblies are actuated, no fluid is supplied.

The number of control valves/control valve assemblies may be different from the number of fluid dispensers. Thus, one control valve/control valve assembly may supply one or more fluid dispensers even though they are all arranged to wash only one target object. This will depend on the size and the nature of the target object to be washed.

The control valves/control valve assemblies may be directly connected to the control unit but in some cases the control valves/control valve assemblies may be connected to an intermediate means which in turn is connected to the control unit. It may be preferred that said intermediate means is a CAN bus. Such configuration is important in the event that a large number of target objects are present in which case excessive wiring can be avoided.

Sensor means such as temperature sensor means may be provided for obtaining parameters relating to, for example, the temperature of the fluid flowing through the system. Temperature related parameters can be received by the control unit for the purpose of controlling the operation of at least one pump. In other advantageous examples, the sensor means may output temperature data to a Controller Area Network (CAN) also connected to the control unit so as to be fed by data from the vehicle such as the above mentioned parameters relating to the temperature.

Fluid parameters such as fluid density or viscosity can be accurately determined. Both parameters are of key importance for assessing whether fluid flows well or not. Fluid temperature affects viscosity and thus the flow rate of fluid that is supplied by the pumps. When fluid is hot, it flows well within the system. On the contrary, however, when fluid temperature is low, for example, to the extent that the fluid becomes frozen or semi-frozen, it does not flow well within the system.

Based on said parameters, more or less pumps may be selected by the control unit to be operated during more or less time and with more or less power depending upon the determined washing requirements of at least one target object, that is, the above mentioned soiling status or dirtiness condition of at least one target object.

For example, if the temperature of the fluid flowing through the present fluid dispensing system that has been detected either from the CAN or from temperature sensors is determined to exceed a determined temperature threshold, the capacity or power of one or more pumps may be varied accordingly by the control unit. Temperature information other than that of the fluid may be also useful for selecting or more pumps to be operated. In general, suitable fluid parameters may be fed to the control unit for selecting at least one pump to be operated, determining when at least one pump is to be operated, determining the power of said at least one pump being operated, etc. Efficient pump management is thus attained.

Other types of sensors may be also provided. For example, a flowmeter may be provided for measuring the amount of fluid that is supplied from the fluid source. The flowmeter may be used to check the fluid flow rate relative to a theoretical fluid flow rate. A fluid level sensor may be also provided to measure the level of fluid in the fluid source. A dirt sensor configured to determine a dirtiness condition of at least one target object may be also provided.

In operation, where at least one portion of at least one target object in a motor vehicle is determined that is required to be washed, an amount of fluid for washing said at least one target object is determined, and a pump is actuated according to said determined washing requirement for dispensing washing fluid to said at least one portion of said at least one target object. In this respect, at least one target object to be washed may be prioritized. This may refer to the operation of at least one control valve, and/or at least one fluid dispenser, in case that said determined washing requirement of at least one target object is considered to exceed the performance of at least one pump due, for example, to wear, failure, etc. Prioritizing the operation of at least one control valve may be based on the location or the specific function of at least one target object that is required to be washed, as described above.

At least one operating parameter related to the operation of at least one pump at a given height may be determined and compared to a predetermined parameter representative of a proper operation of the pump. If such operating parameter is not at least substantially similar to the predetermined parameter, the method then determines at least one operating parameter related to the operation of at least one further pump at a lower, different height.

Determining at least one operating parameter is repeated until the operating parameter is at least substantially similar to the predetermined parameter. A value corresponding to the height in the fluid source of said pump whose operating parameter is at least substantially similar to the predetermined parameter is provided, indicative of the fluid level in the fluid source.

With the present fluid dispensing system, residual fluid trapped within telescopic fluid dispensers or in a section between the at least one telescopic fluid dispenser and the at least one control valve assembly is drained out such that the fluid dispenser can be brought back to its rest position concealed in the vehicle.

Also the present fluid dispensing system has advantages associated with telescopic fluid dispensers fed with a number of pumps under the control of the control unit such that the pumps are capable of accurately delivering fluid to any fluid dispensing system. The number of pumps and how they are operated to wash target objects is efficiently determined according to specific target washing requirements. The number of pumps and their corresponding specific operating power to provide a suitable flow rate and pressure of fluid is accurately determined based on soiling status or dirtiness conditions of the target objects, fluid temperature, nature, and specific function of target objects, location or position of target objects, for example relative to the fluid dispensers, operating condition of a motor vehicle where target objects are fitted (motor vehicle moving forward, moving backwards, stopped, parked, etc.), and so forth. Based on one or more of said parameters, washing fluid can be thus supplied into one or more fluid dispensers to be appropriately delivered towards one or more target objects.

When washing requirements are found to be greater than washing availability, the precise number of pumps to be operated is efficiently adjusted and their operation is prioritized. Target objects to be washed are also suitably prioritized according for example to their location and/or their nature and/or their impact on driving as described above, for example, depending upon when a motor vehicle where a target object is fitted is moving forward, backwards, or it is stopped or parked.

Pump power and washing requirements can be suitably balanced so as to provide efficient washing operation. As a result, the present fluid dispensing system has been found to be extremely advantageous in extending pump service life. Parts in the system and arrangement such as pumps wear equally.

In addition, with the present fluid dispensing system the quantity of fluid remaining in a fluid source in certain checkpoints can be properly assessed. The amount of fluid that is delivered can be estimated considering factory settings and machine learning adjustment in use. A self-learning feature may be implemented to correct estimation errors.

Also, total or partial blockage in the operation of parts in the present fluid dispensing system such as pumps, fluid dispensers, and solenoid valves can be identified when fluid is not properly reaching at least one target object.

Furthermore, the present fluid dispensing system has been found to be useful for calculating fluid consumption from operating parameters of the pumps such as current and the flow rate of fluid that is delivered.

A further important advantage of the present fluid dispensing system relates to diagnostic functions. Pumps can be determined to be replaced when an abnormal change in current intensity is detected. For example, when current abnormally raises after a working period of time, which may be due for example to a pump engine coil that may be in whole or in part short-circuited, such pump can be determined to be replaced. In addition, power failures can be also detected when no current flows when voltage is being applied. This would mean loss of electrical contact or failure in leading wires, for example. Also, rotor blockages can be detected when current amperage in pumps raises up to a locked rotor intensity value, which would mean that rotor may be blocked due for example to freezing as a result of, for example, improper use of cooling fluid. Furthermore, a low amperage problem in pumps can be detected when they are operated but do not pump. This may be due to abnormally low pump amperage indicative of air suction by the pump or priming failure.

BRIEF DESCRIPTION OF THE DRAWINGS

A non-limiting example of the present disclosure will be described in the following, with reference to the appended drawings.

In the drawings.

DETAILED DESCRIPTION OF ONE EXAMPLE

Figure 1:
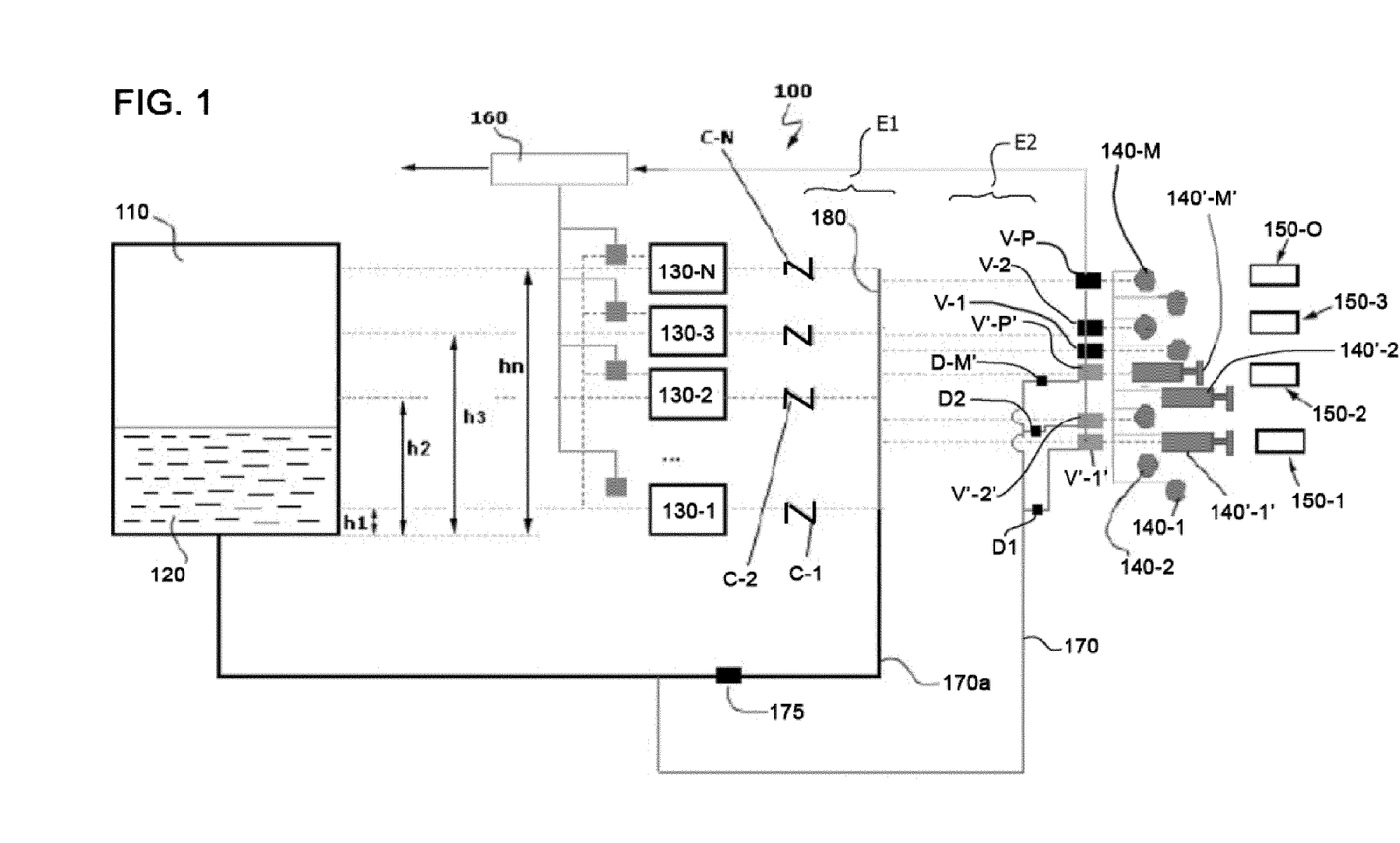
FIG. 1 is a diagram that diagrammatically shows one example of the present fluid dispensing system.

One non-limiting example of a fluid dispensing system for washing at least one portion of at least one target object 150-1, 150-2, 150-3, . . . , 150-O in a motor vehicle has been illustrated in FIG. 1 of the drawings.

The fluid dispensing system 100 is intended for washing surfaces of parts, i.e. target objects 150-1, 150-2, 150-3, . . . , 150-O, in a motor vehicle. A target object 150-1, 150-2, 150-3, . . . , 150-O in the example shown may be for example a number of different objects such as a Lidar, cameras, windshields, sensors or sensor covers. Target objects 150-1, 150-2, 150-3, . . . , 150-O may have different cleaning requirements according to their soiling status or dirtiness condition so they may require different amounts of fluid or washing liquid 120 for being properly washed. Those skilled in the art will however readily recognize that applications other than the one described herein are of course possible, and that a number of fluid dispensing systems 100 may be used defining a fluid dispensing arrangement.

The fluid dispensing system 100 comprises at least one fluid source 110. In this example, the fluid source is a tank 110 suitable to contain a washing liquid 120 therein. One or more pumps are connected to the tank 110. In the particular example shown, N radial turbo centrifugal pumps 130-1, 130-2, 130-3, . . . , 130-N are connected to the tank 110.

The pumps 130-1, 130-2, 130-3, . . . , 130-N are configured to be supplied with washing liquid 120 from the tank 110 with an operating pressure of 2-3 bar and a flow rate of 0-5000 $cm^3$/min and in general of the order of 2000 to 3000 $cm^3$/min. In the example shown, the points where the pumps 130-1, 130-2, 130-3, . . . , 130-N are connected to the tank 110 are arranged at different heights h1, h2, h3, . . . , hn to the ground. The pumps 130-1, 130-2, 130-3, . . . , 130-N are arranged in parallel to each other, that is, fluid lines associated with the pumps 130-1, 130-2, 130-3, . . . , 130-N are arranged in parallel. Other configurations with pumps 130-1, 130-2, 130-3, . . . , 130-N arranged in series may be possible, if required.

In the present example, a number M' of telescopic fluid dispensers 140'-1', 140'-2', 140'-3', . . . , 140'-M' are provided to receive washing liquid 120 from at least one pump 130-1, 130-2, 130-3, . . . , 130-N and dispensing it towards at least one target object 150-1, 150-2, 150-3, . . . , 150-O.

The telescopic fluid dispensers 140'-1', 140'-2', 140'-3', . . . , 140'-M' each comprises two bodies, not shown, that can be displaced relative to each other, and a spring member, not shown. When the pressure of the washing liquid 120 is greater than the spring rate, one body is caused to move or extend relative to the other body of the telescopic fluid dispenser 140'-1', 140'-2', 140'-3', . . . , 140'-M' while the washing liquid 120 is delivered out to one or more target objects 150-1, 150-2, 150-3, . . . , 150-O. When the pressure of the washing liquid 120 that is being supplied is lower than the spring rate such that the spring force is greater than that from the pressure of washing liquid 120, one body of the telescopic fluid dispenser 140'-1', 140'-2', 140'-3', . . . , 140'-M' is returned to its initial retracted position concealed in the vehicle, while the flow of washing liquid 120 is ceased. The telescopic fluid dispensers 140'-1', 140'-2', 140'-3', . . . , 140'-M' are thus capable of extending from a rest position, concealed in a motor vehicle surface, to an extended position and retracting from the extended position to the rest position, concealed again in the motor vehicle surface.

In the present example, a number M of non-telescopic fluid dispensers 140-1, 140-2, 140-3, . . . , 140-M are also provided. The non-telescopic fluid dispensers 140-1, 140-2, 140-3, . . . , 140-M are also configured to receive washing liquid 120 from at least one pump 130-1, 130-2, 130-3, . . . , 130-N and dispensing it towards at least one target object 150-1, 150-2, 150-3, . . . , 150-O. Thus, one or more fluid dispensers 140-1, 140-2, 140-3, . . . , 140-M; 140'-1', 140'-2', 140'-3', . . . , 140'-M' can supply washing liquid 120 to one or more target objects 150-1, 150-2, 150-3, . . . , 150-O as required.

As with the pumps 130-1, 130-2, 130-3, . . . , 130-N, fluid lines feeding the fluid dispensers 140-1, 140-2, 140-3, . . . , 140-M; 140'-1', 140'-2', 140'-3', . . . , 140'-M' may be preferably arranged in parallel. Other arrangements are possible.

The number M, M' of fluid dispensers 140-1, 140-2, 140-3, . . . , 140-M or 140'-1', 140'-2', 140'-3', . . . , 140'-M' may be different from the number N of pumps 130-1, 130-2, 130-3, . . . , 130-N, or they may be the same, as required. The number M of non-telescopic fluid dispensers 140-1, 140-2, 140-3, . . . , 140-M may be different from the number N' of telescopic fluid dispensers 140'-1', 140'-2', 140'-3', . . . , 140'-M', or they may be the same, as required, and correspond or not with the number of target objects 150-1, 150-2, 150-3, . . . , 150-O depending on the size of the target objects 150-1, 150-2, 150-3, . . . , 150-O to be washed, for example.

At least one control unit 160 is provided. Specifically, an electronic control unit (ECU) 160 is provided. The ECU 160 is configured to select one or more pumps 130-1, 130-2, 130-3, . . . , 130-N and operate said one or more pumps 130-1, 130-2, 130-3, . . . , 130-N for supplying washing liquid 120 to one or more fluid dispenser 140-1, 140-2, 140-3, . . . , 140-M; 140'-1', 140'-2', 140'-3', . . . , 140'-M' to wash one or more target objects 150-1, 150-2, 150-3, . . . , 150-O according to one or more of the following:

- a command for washing at least one target object 150-1, 150-2, 150-3, . . . , 150-O according to a detected soiling status or dirtiness condition of the target objects 150-1, 150-2, 150-3, . . . , 150-O, or at the request of a user;
- pump accumulated wearing or fatigue, i.e. a condition of the pumps 130-1, 130-2, 130-3, . . . , 130-N, which may be carried out by the ECU 160 based on flow rate-pressure and flow rate-current characteristic curves of the pumps 130-1, 130-2, 130-3, . . . , 130-N, and specifically through pump operating parameters such as voltage, current, fluid flow rate, frequency or torque, with current being the most preferred;
- the nature of the target objects 150-1, 150-2, 150-3, . . . , 150-O to be washed;
- a function of the target objects 150-1, 150-2, 150-3, . . . , 150-O relative to the fluid dispensers 140-1, 140-2, 140-3, . . . , 140-M or 140'-1', 140'-2', 140'-3', . . . , 140'-M'.

The ECU 160 is capable of adjusting pump parameters such as fluid flow rate and fluid pressure according to the need for at least one target object 150-1, 150-2, 150-3, . . . , 150-O to be washed. For example, when a number of target objects 150-1, 150-2, 150-3, . . . , 150-O is determined by the ECU 160 to be washed, a specific number of pumps 130-1, 130-2, 130-3, . . . , 130-N is selected by the ECU 160 to deliver for example about 30 to 90 cm$^3$ of washing liquid 120 in each washing cycle for each target object 150-1, 150-2, 150-3, . . . , 150-O. A washing cycle may typically last 1 to 3 s. A suitable amount of washing liquid 120 can be thus delivered to target object 150-1, 150-2, 150-3, . . . , 150-O for properly washing them.

The ECU 160 is also capable of adjusting pump operation according to said operating parameters. For example, when pump current, i.e. pump power, below a given threshold is detected, this is interpreted by the ECU 160 to mean that the pump 130-1, 130-2, 130-3, . . . , 130-N is wearing. The ECU 160 will then cause said pump 130-1, 130-2, 130-3, . . . , 130-N to be less used, that is, a lower power is supplied to said pump 130-1, 130-2, 130-3, . . . , 130-N based on the above mentioned characteristic curves.

If for example pump current values are of 2-4 A such as 3 A, a pump 130-1, 130-2, 130-3, . . . , 130-N is determined to work properly. If pump current values are out of said predefined operating threshold, this means that the pump 130-1, 130-2, 130-3, . . . , 130-N is malfunctioning. For example, a pump current value of about 0 A may mean that the pump 130-1, 130-2, 130-3, . . . , 130-N is not operational due to a broken component. For example, pump current value of about 1 A may mean that no liquid is being supplied but air. For example, pump current value of about 7 or 8 A may mean that the liquid is frozen. Depending on the power of the pump 130-1, 130-2, 130-3, . . . , 130-N, the pump current value may reach 10 A when the liquid is frozen. A pump abnormal operation caused by short circuit may correspond for example to a pump current value of about 10 A or higher.

As stated above, the ECU 160 is also capable of prioritising pumps 130-1, 130-2, 130-3, . . . , 130-N to be operated, and prioritising target objects 150-1, 150-2, 150-3, . . . , 150-O to be washed, as described below.

Prioritisation of pumps 130-1, 130-2, 130-3, . . . , 130-N by the ECU 160 may be performed by comparing different operating parameters relating to the operation of at least one pump 130-1, 130-2, 130-3, . . . , 130-N, such as for example voltage and current, with data relating to the detected need for washing target objects 150-1, 150-2, 150-3, . . . , 150-O. Based on said pump operation parameters, at least one selected pump 130-1, 130-2, 130-3, . . . , 130-N will be operated by the ECU 160 for appropriately supplying washing liquid 120 into at least one target object 150-1, 150-2, 150-3, . . . , 150-O.

Prioritisation of target objects 150-1, 150-2, 150-3, . . . , 150-O by the ECU 160 may be performed, as stated above, according to their intended function. When a set of target objects 150-1, 150-2, 150-3, . . . , 150-O comprising for example a Lidar, front cameras, side cameras, and a rear camera, is required to be washed, and flow rate and/or pressure of the washing liquid 120 is considered by the ECU 160 not to be available or sufficient for properly washing all those target objects 150-1, 150-2, 150-3, . . . , 150-O at the same time, the ECU 160 then prioritizes one or more target objects 150-1, 150-2, 150-3, . . . , 150-O to be washed depending upon a specific function of the target objects 150-1, 150-2, 150-3, . . . , 150-O to be washed, and then selects one or more pumps 130-1, 130-2, 130-3, . . . , 130-N and/or fluid dispensers 140-1, 140-2, 140-3, . . . , 140-M or 140'-1', 140'-2', 140'-3', . . . , 140'-M' accordingly. For example, under this situation, the front camera in said set of target objects 150-1, 150-2, 150-3, . . . , 150-O will be prioritized by the ECU 160 in the event that the motor vehicle where the front camera is fitted is moving forward. A rear camera will be prioritized by the ECU 160 in the event that the motor vehicle where the rear camera is fitted is moving backwards.

The above mentioned parameters relating to the operation of at least one pump 130-1, 130-2, 130-3, . . . , 130-N, may also be used by the ECU 160 to determine the presence of fluid flow in the system 100.

On the other hand, the ECU 160 is also capable of detecting, based on said pump operating parameters, when a pump 130-1, 130-2, 130-3, . . . , 130-N is completely broken or unusable, and if it is required to be replaced.

As stated above, pumps 130-1, 130-2, 130-3, . . . , 130-N in the example being described are arranged in the tank 110 such that their respective connections to the tank 110 are arranged at different heights h1, h2, h3, . . . , hn to the ground in the non-limiting example describe herein. Arranging pumps 130-1, 130-2, 130-3, . . . , 130-N at different heights h1, h2, h3, . . . , hn in the tan k 110 allows a volume of washing liquid 120 present in the tank 110 to be accurately determined by the ECU 160 based on the above mentioned pump operating parameters, such as voltage, current, washing liquid flow rate, frequency and so on. When a pump 130-1, 130-2, 130-3, . . . , 130-N is operated, it could happen that the pump 130-1, 130-2, 130-3, . . . , 130-N draws air instead of washing liquid because of washing liquid level in the tank 110 located below the pump 130-1, 130-2, 130-3, . . . , 130-N, in which case pump current will be the operating parameter to be used. On the other hand, when a pump 130-1, 130-2, 130-3, . . . , 130-N is operated and washing liquid is drawn because washing liquid level in the tank 110 is above the pump 130-1, 130-2, 130-3, . . . , 130-N, then pump voltage will be the operating parameter to be used.

The fact that accurately determining a volume of washing liquid 120 in the tank 110 is carried out based on said operating parameters means that the ECU 160 is fed with at least one of said operating parameters associated with the pumps 130-1, 130-2, 130-3, . . . , 130-N. Said operating parameters are compared with predetermined operating parameters for the purpose of assessing changes in operating parameters and if they are within predetermined or acceptable ranges.

Also, arranging pumps 130-1, 130-2, 130-3, . . . , 130-N with their connections to the tank 100 located at different heights h1, h2, h3, . . . , hn allows the ECU 160 to select one or more pumps 130-1, 130-2, 130-3, . . . , 130-N at lower levels in the tank 110 when a given pump 130-1, 130-2, 130-3, . . . , 130-N at a higher level in the tank 110 is determined not to work properly.

Intelligent pump management is thus advantageously performed by the ECU 160 through pump status control. Pumps 130-1, 130-2, 130-3, . . . , 130-N detected to be with less wear can be appropriately selected by the ECU 160 to be operated. Pump age over time and usage is accurately controlled and service life of different parts such as pumps 130-1, 130-2, 130-3, . . . , 130-N, fluid dispensers 140-1, 140-2, 140-3, . . . , 140-M or 140'-1', 140'-2', 140'-3', . . . , 140'-M', etc. is advantageously extended, while overall system efficiency is increased.

The ECU 160 is also capable of checking active and available pumps 130-1, 130-2, 130-3, . . . , 130-N. Pumps 130-1, 130-2, 130-3, . . . , 130-N may be considered by the ECU 160 to be not available for example when they are located far from the target objects 150-1, 150-2, 150-3, . . . , 150-O, or when they are located at a great height h1, h2, h3, . . . , hN in the tank 110, above washing liquid height. Pumps 130-1, 130-2, 130-3, . . . , 130-N may also be considered not to be available when they are broken and/or are no longer working in the same way as they originally worked due for example to wear.

In addition, the ECU 160 is also capable to dynamically react to a failure occurring when trying to wash one or more target objects 150-1, 150-2, 150-3, . . . , 150-O, recalculating washing power available and prioritizing target objects 150-1, 150-2, 150-3, . . . , 150-O again where necessary to ensure safety in driving.

The ECU 160 in the present example is suitable to render operating flow rates stable among pumps 130-1, 130-2, 130-3, . . . , 130-N of the same type. Pumps 130-1, 130-2, 130-3, . . . , 130-N are thus caused to work stably over time and correlated with temperature. Also, the ECU 160 in the present example is capable of causing washing liquid 120 to be recirculated when pump performance detriment is detected due to usage. Other capabilities of the ECU 160 in the present example is to operate one pump 130-1, 130-2, 130-3, . . . , 130-N with the valves present in the circuit in a closed state in order to detect valve failures or leaks.

Fluid distribution is carried out by a suitable manifold 180. Manifold 180 comprises a body with a number of inlets into which washing liquid 120 is gathered from the pumps 130-1, 130-2, 130-3, . . . , 130-N, and a number of outlets from which the washing liquid 120 is delivered to the target objects 150-1, 150-2, 150-3, . . . , 150-O via fluid dispensers 140-1, 140-2, 140-3, . . . , 140-M; 140'-1', 140'-2', 140'-3', . . . , 140'-M'. Manifold 180 has a first manifold chamber E1 including said inlets and said outlets, and an independent, second manifold chamber E2 fluidly connected to a first return line 170 which will be described below.

A number P' of control valve assemblies V'-1, V'-2, . . . , V'-P' is provided. The control valve assemblies V'-1, V'-2, . . . , V'-P' can be actuated by the above mentioned control unit 160. Each control valve assembly V'-1, V'-2, . . . , V'-P' is arranged between the manifold 180 and the at least one telescopic fluid dispenser 140'-1, 140'-2, 140'-3, . . . , 140'-M'.

Figure 2:
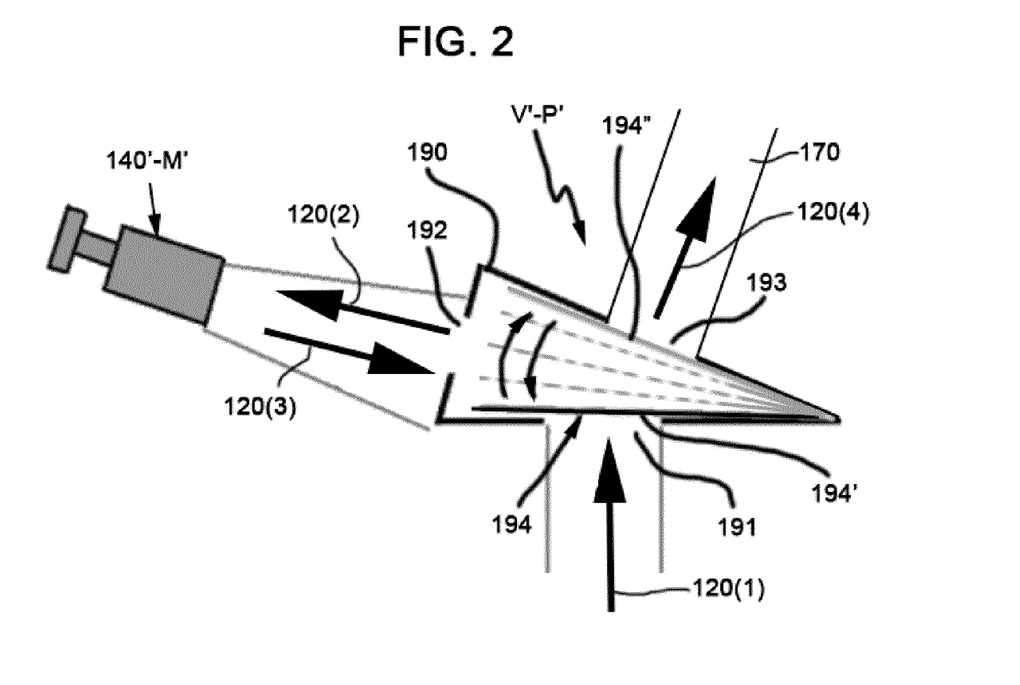
FIG. 2 is a diagrammatical representation of one example of one control valve assembly used in the fluid dispensing system of FIG. 1.

Now referring to FIG. 2 of the drawings, each control valve assembly V'-1, V'-2, . . . , V'-P' comprises a valve body 190 having at least one fluid inlet 191 for receiving washing liquid 120 from the tank 110 according to an fluid intake direction 120(1), at least one first fluid outlet 192 for discharging washing liquid 120 into the telescopic fluid dispenser 140'-1, 140'-2, 140'-3, . . . , 140'-M' according to a first flow direction 120(2) of washing liquid 120 flowing out through said first fluid outlet 192, and at least one second fluid outlet 193 for allowing washing liquid 120 to flow according to a second, opposite flow direction 120(3) of washing liquid 120 flowing into said first fluid outlet 192 to then flow back away from the telescopic fluid dispenser 140'-1', 140'-2', 140'-3', . . . , 140'-M' according to a fluid backflow direction 120(4) into the first return line 170 when the telescopic fluid dispenser 140'-1, 140'-2, 140'-3, . . . , 140'-M' retracts from the extended position to the rest position, concealed in the vehicle. In this way, the second fluid outlet 193 allows residual washing liquid trapped within the telescopic fluid dispenser 140'-1', 140'-2', 140'-3', . . . , 140'-M' to flow back away therefrom when the at least one telescopic fluid dispenser 140'-1', 140'-2', 140'-3', . . . , 140'-M' retracts into the rest position.

Within the valve body 190, a movable valve element 194 is provided. The movable valve element is, in this example, a rubber membrane 194 capable of being pivoted into at least a first end position 194' closing the fluid inlet 191 such that washing liquid 120 is prevented from entering the valve body 190 when no washing liquid 120 is flowing from the tank 110. The rubber membrane 194 is also capable of being pivoted into a second end position 194" pushed by washing liquid 120 flowing through the fluid inlet 191 from the tank 110 into the valve body 190 such that washing liquid 120 is allowed to flow through the first fluid outlet 192 into the telescopic fluid dispenser 140'-1', 140'-2', 140'-3', . . . , 140'-M' according to the above mentioned first flow direction 120(2) while it is prevented from flowing through the second fluid outlet 193 according to the fluid backflow direction 120(4) out of the valve body 190. The rubber membrane 194 may be pivoted from the first end position 194' to the second end position 194" against the action of a spring, not shown. The rubber membrane 194 may be also pivoted into different intermediate positions other than said first and second end positions 194', 194" as shown in FIG. 2.

As stated above, the second fluid outlet 193 of the valve body 190 in each control valve assembly V'-1, V'-2, . . . , V'-P' is connected to the first return line 170 which in turn fluidly connects the manifold 180 and the tank 110. Washing liquid 120 is allowed to flow towards the tank 110 resulting in that the telescopic fluid dispensers 140'-1', 140'-2', 140'-3', . . . , 140'-M' can be fully returned back to their retracted position, concealed in a vehicle, even in the case that remaining washing liquid 120 is still present therein during retracting movement or after a washing operation is complete. The first return line 170, however, could be connected to other locations such as an additional tank, or out of the fluid dispensing system 100, or even to a second return line 170a which is described below.

A solenoid valve 175 is provided in the second return line 170a and connected to the control unit 160 for controlling washing liquid 120 flowing therethrough.

A second return line 170a fluidly connects the manifold 180 and the tank 110 for recirculating fluid 120 towards the tank 110. The second return line 170a allows the ECU 160 to perform an auto-check or self-testing function for self-checking operation of one or more of the pumps 130-1, 130-2, 130-3, . . . , 130-N, check valves C-1, C-2, . . . , C-N, solenoid valves 175, fluid dispensers 140-1, 140-2, 140-3, . . . , 140-M; 140'-1', 140'-2', 140'-3', . . . , 14'0-M', etc. Auto-check function is performed by the ECU 160 by operating pumps 130-1, 130-2, 130-3, . . . , 130-N and closing solenoid valves 175 causing washing liquid 120 to recirculate through second return line 170a. This allows the ECU 160 to assess whether pumps 130-1, 130-2, 130-3, . . . , 130-N and check valves C-1, C-2, . . . , C-N are working properly, for example. Leaks of washing liquid 120 in the circuit can be also detected by controlling the level of washing liquid 120 in the tank 110 when recirculation is performed. Alternatively, or in addition, a fluid level controller may be provided for controlling the level of washing liquid 120 in the tank 110.

A number M' of check-valves D1, D2, . . . , DM' is provided. Each check-valve D1, D2, . . . , DM' is fluidly connected to the control valve assembly V'-1, V'-2, . . . , V'-P'. The check-valves D1, D2, . . . , DM' serve the purpose of preventing backflow of fluid from the one telescopic fluid dispensers 140'-1, 140'-2, 140'-3', . . . , 140'-M' into another telescopic fluid dispenser 140'-1', 140'-2', 140'-3', . . . , 140'-M'.

Another number N of check-valves C-1, C-2, . . . , C-N is provided the pumps 130-1, 130-2, 130-3, . . . , 130-N and the manifold 180 to prevent backflow of washing liquid 120 towards the pumps 130-1, 130-2, 130-3, . . . , 130-N which are not in use. The washing liquid 120 thus only flows in a single direction out of the fluid dispensing system 100, from the manifold 180 to the fluid dispensers 140-1, 140-2, 140-3, . . . , 140-M; 140'-1, 140'-2, 140'-3', . . . , 140'-M'.

Control valves V-1, V-2, . . . , V-P are also provided between the manifold 180 and the non-telescopic fluid dispensers 140-1, 140-2, 140-3, . . . , 140-M. The control valves V-1, V-2, . . . , V-P are thus associated with corresponding non-telescopic fluid dispensers 140-1, 140-2, 140-3, . . . , 140-M. Control valves V-1, V-2, . . . , V-P are actuated by the control unit 160. In this case, the above mentioned solenoid valve 175 is arranged between the tank 110 and the control valves V-1, V-2, . . . , V-P and/or the control valve assemblies V'-1, V'-2, . . . , V'-P'.

The ECU 160 is also configured to be fed with temperature values from the washing liquid 120 flowing through the fluid dispensing system 100. From said temperature values of the washing liquid 120, the ECU 160 can further monitor operation of pumps 130-1, 130-2, 130-3, . . . , 130-N. Temperature values of the washing liquid 120 can be supplied from at least one temperature sensor or from a motor vehicle Controller Area Network (CAN), not shown. Temperature related parameters of the washing liquid 120 such as viscosity may be also fed to the ECU 160. For example, if the temperature of the washing liquid 120 flowing through the fluid dispensing system 100 is determined by the ECU 160 to exceed a determined threshold, the power of one or more pumps 130-1, 130-2, 130-3, . . . , 130-N may be varied accordingly by the ECU 160.

The arrangement with the present fluid dispensing system 100 further includes a number P of control valves V-1, V-2, . . . , V-P arranged between the manifold 180 and the fluid dispensers 140-1, 140-2, 140-3, . . . , 140-M or 140'-1', 140'-2', 140'-3', . . . , 140'-M'.

A washing operation using the present arrangement having the present fluid dispensing system 100 described above is as follows. First, a command for washing at least one target object 150-1, 150-2, 150-3, . . . , 150-O is received by the ECU 160 or a washing command is received at the request of the user. In some cases, target object washing requirements may be determined based on which a washing command is output. The ECU 160 then prioritizes one or more of said target objects 150-1, 150-2, 150-3, . . . , 150-O that have been determined to require washing according to a soiling status or dirtiness condition of the target objects 150-1, 150-2, 150-3, . . . , 150-O. The ECU 160 then determines which target objects 150-1, 150-2, 150-3, . . . , 150-O have to be washed according to said soiling status or dirtiness condition, that is, the ECU 160 determines one or more of pressure, amount, and flow rate of washing liquid 120 to be delivered. The ECU 160 then selects, and in some cases prioritizes, a number of pumps 130-1, 130-2, 130-3, . . . , 130-N according to said washing requirement. Selected pumps 130-1, 130-2, 130-3, . . . , 130-N are operated according to said washing requirement with specific power for delivering (e.g. spraying) a suitable flow rate of washing liquid 120 with a given pressure towards selected target objects 150-1, 150-2, 150-3, . . . , 150-O.

Prioritizing target objects 150-1, 150-2, 150-3, . . . , 150-O to be washed and pumps 130-1, 130-2, 130-3, . . . , 130-N to be operated are performed by the ECU 160 in case that said determined washing requirement of at least one target object 150-1, 150-2, 150-3, . . . , 150-O is considered to exceed the performance of at least one pump 130-1, 130-2, 130-3, . . . , 130-N due, for example, to wear, failure, etc.

Prioritizing target objects 150-1, 150-2, 150-3, . . . , 150-O and pumps 130-1, 130-2, 130-3, . . . , 130-N may be also performed by the ECU 160 based on the specific a specific function of the target objects 150-1, 150-2, 150-3, . . . , 150-O to be washed as stated above.

In the non-limiting example shown in the figure in which points where pumps 130-1, 130-2, 130-3, . . . , 130-N are connected to the tank 110 are at different heights h1, h2, h3, hn, said one or more parameters related to the operation of pumps 130-1, 130-2, 130-3, . . . , 130-N at said corresponding heights h1, h2, h3, . . . , hn are determined by the ECU 160 for the purpose of calculating a volume of washing liquid 120 present in the tank 110. Specifically, the ECU 160 is fed with one or more pump operation parameters at a given height h1, h2, h3, . . . , hn. Said operating parameters are compared to predetermined operating parameters representative of a proper operation of the pump 130-1, 130-2, 130-3, . . . , 130-N arranged at said height h1, h2, h3, . . . , hn. If the pump operating parameter input to the ECU 160 is not at least substantially similar to the predetermined operating parameter, at least one operating parameter related to the operation of at least one further pump 130-1, 130-2, 130-3, . . . , 130-N whose tank connecting point is arranged at a lower height h1, h2, h3, . . . , hn is then input to the ECU 160. This is repeated until the operating parameter input to the ECU 160 is at least substantially similar to the predetermined parameter. A value corresponding to the height h1, h2, h3, . . . , hn in the tank 110 where said further pump 130-1, 130-2, 130-3, . . . , 130-N is located whose operating parameter is at least substantially similar to the predetermined parameter is given indicative of a height h1, h2, h3, . . . , hn in the tank 110 where there is washing liquid 120.

Although only a number of examples of said fluid dispensing system, arrangement and washing method have been disclosed herein, other alternatives, modifications, uses and/or equivalents thereof are possible. Furthermore, all possible combinations of the described examples are also covered. Thus, the scope of the present disclosure should not be limited by particular examples but should be determined only by a fair reading of the claims that follow. Reference signs related to drawings placed in parentheses in a claim are solely for attempting to increase the intelligibility of the claim and shall not be construed as limiting the scope of the claim.

The invention claimed is:

1. A fluid dispensing system comprising:
   at least one fluid source;
   a plurality of pumps each configured to be supplied with fluid from the at least one fluid source;
   a plurality of fluid dispensers each configured to receive the fluid from at least two of the plurality of pumps and dispensing the fluid towards at least one target object;
   at least one control unit configured to operate at least one selected pump of the plurality of pumps for supplying the fluid according to a received command of washing the at least one target object;
   a manifold having a plurality of inlets into which the fluid is gathered from the plurality of pumps, and a plurality of outlets from which the fluid is distributed towards the at least one target object; and
   at least one check valve arranged between the plurality of pumps and the manifold for preventing backflow towards the plurality of pumps.

2. The fluid dispensing system set forth in claim 1, wherein the plurality of pumps are arranged at different heights.

3. The fluid dispensing system set forth in claim 2, wherein the at least one control unit is configured to monitor at least one change in at least one operating parameter related to the operation of the at least one selected pump of the plurality of pumps and to determine a volume of the fluid present in the at least one fluid source based on the operating parameter change.

4. The fluid dispensing system set forth in claim 3, wherein the plurality of inlets and outlets in the manifold converge within a single manifold chamber.

5. The fluid dispensing system set forth in claim 4, wherein at least a portion of the plurality of the pumps are arranged in parallel to each other.

6. The fluid dispensing system set forth in claim 5, further comprising at least one control valve, arranged between the manifold and the plurality of fluid dispensers, the at least one control valve being actuated by the at least one control unit.

7. The fluid dispensing system set forth in claim 6, wherein the at least one control unit is configured to compare operating parameters relating to the operation of the at least one selected pump of the plurality of pumps with data relating to detected need of the at least one target object so as to operate the at least one selected pump of the plurality of pumps for supplying the fluid.

8. The fluid dispensing system set forth in claim 7, further comprising a fluid temperature sensor means configured to provide parameters relating to the temperature of the fluid which can be read by the at least one control unit to monitor the operation of at the least one selected pump of the plurality of pumps.

9. The fluid dispensing system set forth in claim 8, further comprising at least one return line adapted to recirculate the fluid towards the fluid source, the return line being arranged fluidly connecting the manifold and the at least one fluid source.

10. The fluid dispensing system set forth in claim 1, wherein the at least one control unit is configured to monitor at least one change in at least one operating parameter related to the operation of the at least one selected pump of the plurality of pumps and to determine a volume of the fluid present in the at least one fluid source based on the operating parameter change.

11. The fluid dispensing system set forth in claim 1, wherein the plurality of inlets and outlets in the manifold converge within a single manifold chamber.

12. The fluid dispensing system set forth in claim 1, wherein at least a portion of the plurality of the pumps are arranged in parallel to each other.

13. The fluid dispensing system set forth in claim 1, further comprising at least one control valve, arranged between the manifold and the plurality of fluid dispensers, the at least one control valve being actuated by the at least one control unit.

14. The fluid dispensing system set forth in claim 1, wherein the at least one control unit is configured to compare operating parameters relating to the operation of the at least one selected pump of the plurality of pumps with data relating to detected need of the at least one target object so as to operate at the least one selected pump of the plurality of pumps for supplying the fluid.

15. The fluid dispensing system set forth in claim 1, further comprising a fluid temperature sensor means configured to provide parameters relating to the temperature of the fluid which can be read by the at least one control unit to monitor the operation of the at least one selected pump of the plurality of pumps.

16. The fluid dispensing system set forth in claim 1, further comprising at least one return line adapted to recirculate the fluid towards the at least one fluid source, the return line being arranged fluidly connecting the manifold and the fluid source.

17. The fluid dispensing system set forth in claim 1, wherein the at least one target object is in a motor vehicle and the fluid is washing fluid.

18. A method of washing at least one target object in a motor vehicle, the method comprising:
receiving a command indicative of washing the at least one target object;
selecting at least one of a plurality of pumps,
operating via a control unit the selected pump of the plurality of pumps to dispense washing fluid to the at least one target object; and
preventing the washing fluid from backflowing towards the plurality of pumps by at least one check valve arranged between the plurality of pumps and a manifold including a plurality of inlets and a plurality of outlets.

19. The method set forth in claim 18, further comprising:
prioritizing the operation of at least one control valve in case a washing requirement of the at least one target object is considered to exceed the performance of the selected pump of the plurality of pumps.

20. The method set forth in claim 19, wherein the prioritizing the operation of the at least one control valve is based on a specific function of the at least one target object that is required to be washed.

* * * * *